(12) United States Patent
Mastronardi et al.

(10) Patent No.: US 8,345,819 B2
(45) Date of Patent: Jan. 1, 2013

(54) TOP-DOWN X-RAY INSPECTION TRAILER

(75) Inventors: Richard Mastronardi, Medfield, MA (US); Peter J. Rothschild, Newton, MA (US)

(73) Assignee: American Science and Engineering, Inc., Billerica, MA (US)

( * ) Notice: Subject to any disclaimer, the term of this patent is extended or adjusted under 35 U.S.C. 154(b) by 240 days.

(21) Appl. No.: 12/843,341

(22) Filed: Jul. 26, 2010

(65) Prior Publication Data

US 2011/0026673 A1 Feb. 3, 2011

Related U.S. Application Data

(60) Provisional application No. 61/229,452, filed on Jul. 29, 2009.

(51) Int. Cl.
*H05G 1/02* (2006.01)
*G01N 23/083* (2006.01)
*G01N 23/203* (2006.01)

(52) U.S. Cl. .......................... 378/57; 378/198
(58) Field of Classification Search .................. 378/57, 378/198
See application file for complete search history.

(56) References Cited

U.S. PATENT DOCUMENTS

| | | |
|---|---|---|
| 3,569,708 A | 3/1971 | Weinbaum et al. .......... 250/83.3 |
| 3,868,506 A | 2/1975 | Osigo ........................... 250/278 |
| RE28,544 E | 9/1975 | Stein et al. ................... 250/369 |
| 3,928,765 A | 12/1975 | Teller ........................... 250/272 |
| 3,961,186 A | 6/1976 | Leunbach .................... 250/272 |
| 4,031,401 A | 6/1977 | Jacob ........................... 378/146 |
| 4,047,029 A | 9/1977 | Allport ......................... 250/273 |
| 4,052,617 A | 10/1977 | Garrett et al. ................ 250/360 |
| 4,064,440 A | 12/1977 | Roder .......................... 250/359 |
| 4,260,898 A | 4/1981 | Annis ........................... 250/505 |
| 4,342,914 A | 8/1982 | Bjorkholm ..................... 378/99 |
| 4,380,817 A | 4/1983 | Harding et al. ................ 378/87 |
| 4,458,152 A | 7/1984 | Bonora ......................... 250/353 |
| 4,472,822 A | 9/1984 | Swift ............................. 378/10 |
| 4,525,854 A | 6/1985 | Molbert et al. ................ 378/89 |

(Continued)

FOREIGN PATENT DOCUMENTS

EP 0 261 984 3/1988

(Continued)

OTHER PUBLICATIONS

James L. Flanagan, et al., "Substance Identification Analytics", Proceedings, Europto Series, vol. 2093, Oct. 1993.

(Continued)

*Primary Examiner* — Allen C. Ho
(74) *Attorney, Agent, or Firm* — Sunstein Kann Murphy & Timbers LLP

(57) ABSTRACT

A system and method for inspecting a vehicle by means of one or more sources and detectors of penetrating radiation. The source(s) and detector(s) are carried on a mobile conveyance and deployed at a point of operation. One source swings away from the conveyance on a deployable member, such as a boom, such that the source can irradiate a vehicle from above or below. A detector deploys outwardly from the mobile conveyance, remaining mechanically coupled to the mobile conveyance in a position in a horizontal plane, such that the detector intercepts penetrating radiation from the source positioned above the inspected vehicle, which penetrating radiation has interacted with the inspected vehicle. A ramp may be provided to allow the inspected vehicle to be driven to a position between the vertically irradiating source and a transmission detector.

13 Claims, 3 Drawing Sheets

U.S. PATENT DOCUMENTS

| | | | | |
|---|---|---|---|---|
| 4,768,214 | A | 8/1988 | Bjorkholm | 378/87 |
| 4,799,247 | A | 1/1989 | Annis et al. | 378/87 |
| 4,809,312 | A | 2/1989 | Annis | 378/146 |
| 4,825,454 | A | 4/1989 | Annis et al. | 378/87 |
| 4,839,913 | A | 6/1989 | Annis et al. | 378/44 |
| 4,864,142 | A | 9/1989 | Gomberg | 250/390.04 |
| 4,870,670 | A | 9/1989 | Geus | 378/87 |
| 4,884,289 | A | 11/1989 | Glockmann et al. | 378/57 |
| 4,899,283 | A | 2/1990 | Annis | 364/413.15 |
| 4,974,247 | A | 11/1990 | Friddell | 378/90 |
| 5,002,397 | A | 3/1991 | Ingrum et al. | 356/407 |
| 5,014,293 | A | 5/1991 | Boyd et al. | 378/197 |
| 5,022,062 | A | 6/1991 | Annis | 378/86 |
| 5,065,418 | A | 11/1991 | Bermbach et al. | 378/57 |
| 5,068,883 | A | 11/1991 | DeHaan et al. | 378/86 |
| 5,091,924 | A | 2/1992 | Bermbach et al. | 378/57 |
| 5,132,995 | A | 7/1992 | Stein | 378/56 |
| 5,164,976 | A | 11/1992 | Scheid et al. | 378/146 |
| 5,179,581 | A | 1/1993 | Annis | 378/57 |
| 5,181,234 | A | 1/1993 | Smith | 378/87 |
| 5,224,144 | A | 6/1993 | Annis | 378/146 |
| 5,247,561 | A | 9/1993 | Kotowski | 378/87 |
| 5,253,283 | A | 10/1993 | Annis et al. | 378/100 |
| 5,302,817 | A | 4/1994 | Yokota et al. | 250/214 |
| 5,313,511 | A | 5/1994 | Annis et al. | 378/87 |
| 5,349,191 | A | 9/1994 | Rogers | 250/367 |
| 5,391,879 | A | 2/1995 | Tran et al. | 250/367 |
| 5,394,454 | A | 2/1995 | Harding | 378/86 |
| 5,430,787 | A | 7/1995 | Norton | 378/87 |
| 5,479,023 | A | 12/1995 | Bartle | 250/390.04 |
| 5,591,462 | A | 1/1997 | Darling et al. | 425/173 |
| 5,629,966 | A | 5/1997 | Dykster et al. | 378/57 |
| 5,638,420 | A | 6/1997 | Armistead | 378/57 |
| 5,692,028 | A | 11/1997 | Geus et al. | 378/57 |
| 5,692,029 | A | 11/1997 | Husseiny et al. | 378/88 |
| 5,696,806 | A | 12/1997 | Grodzins et al. | 378/86 |
| 5,763,886 | A | 6/1998 | Schulte | 250/358.1 |
| 5,764,683 | A | 6/1998 | Swift et al. | 378/57 |
| 5,838,759 | A | 11/1998 | Armistead | 378/57 |
| 5,903,623 | A | 5/1999 | Swift et al. | 378/57 |
| 5,910,973 | A | 6/1999 | Grodzins | 378/57 |
| 5,930,326 | A | 7/1999 | Rothschild et al. | 378/57 |
| 5,940,468 | A | 8/1999 | Huang et al. | 378/57 |
| 5,974,111 | A | 10/1999 | Krug et al. | 378/57 |
| 6,018,562 | A | 1/2000 | Willson | 378/9 |
| 6,058,158 | A * | 5/2000 | Eiler | 378/57 |
| 6,067,344 | A | 5/2000 | Grodzins et al. | 378/117 |
| 6,081,580 | A | 6/2000 | Grodzins et al. | 378/87 |
| 6,094,472 | A | 7/2000 | Smith | 378/86 |
| 6,124,647 | A | 9/2000 | Marcus et al. | 307/10.1 |
| 6,151,381 | A | 11/2000 | Grodzins et al. | 378/90 |
| 6,192,104 | B1 | 2/2001 | Adams et al. | 378/90 |
| 6,203,846 | B1 | 3/2001 | Ellingson et al. | 427/137 |
| 6,212,251 | B1 | 4/2001 | Tomura et al. | 378/15 |
| 6,236,709 | B1 | 5/2001 | Perry et al. | 378/57 |
| 6,249,567 | B1 | 6/2001 | Rothschild et al. | 378/88 |
| 6,252,929 | B1 | 6/2001 | Swift et al. | 378/57 |
| 6,269,142 | B1 | 7/2001 | Smith | 378/57 |
| 6,278,115 | B1 | 8/2001 | Annis et al. | |
| 6,282,260 | B1 | 8/2001 | Grodzins | 378/87 |
| 6,292,533 | B1 | 9/2001 | Swift et al. | 378/57 |
| 6,356,620 | B1 | 3/2002 | Rothschild et al. | 378/160 |
| 6,421,420 | B1 | 7/2002 | Grodzins | 378/98.6 |
| 6,424,695 | B1 | 7/2002 | Grodzins et al. | 378/87 |
| 6,434,219 | B1 | 8/2002 | Rothschild et al. | 378/160 |
| 6,442,233 | B1 | 8/2002 | Grodzins et al. | 378/57 |
| 6,459,761 | B1 | 10/2002 | Grodzins et al. | 378/57 |
| 6,459,764 | B1 | 10/2002 | Chalmers et al. | 378/88 |
| 6,473,487 | B1 | 10/2002 | Le | 378/57 |
| 6,542,580 | B1 | 4/2003 | Carver et al. | 378/580 |
| 6,556,653 | B2 | 4/2003 | Hussein | 378/90 |
| 6,563,903 | B2 * | 5/2003 | Kang et al. | 378/57 |
| 6,567,496 | B1 | 5/2003 | Sychev | 378/57 |
| 6,658,087 | B2 | 12/2003 | Chalmers et al. | 378/86 |
| 6,727,506 | B2 | 4/2004 | Mallette | 250/394 |
| 6,763,635 | B1 * | 7/2004 | Lowman | 52/114 |
| 6,785,357 | B2 * | 8/2004 | Bernardi et al. | 378/57 |
| 6,876,719 | B2 | 4/2005 | Ozaki | 378/7 |
| 6,879,657 | B2 | 4/2005 | Hoffman | 378/7 |
| 6,920,197 | B2 * | 7/2005 | Kang et al. | 378/57 |
| 6,928,141 | B2 * | 8/2005 | Carver et al. | 378/57 |
| 6,937,692 | B2 * | 8/2005 | Johnson et al. | 378/57 |
| 7,010,094 | B2 | 3/2006 | Grodzins et al. | 378/86 |
| 7,099,434 | B2 | 8/2006 | Adams et al. | 378/57 |
| RE39,396 | E | 11/2006 | Swift et al. | 378/57 |
| 7,218,704 | B1 | 5/2007 | Adams et al. | 378/57 |
| 7,322,745 | B2 * | 1/2008 | Agrawal et al. | 378/198 |
| 7,352,843 | B2 * | 4/2008 | Hu et al. | 378/57 |
| 7,369,643 | B2 * | 5/2008 | Kotowski et al. | 378/57 |
| 7,400,701 | B1 | 7/2008 | Cason | 378/57 |
| 7,497,618 | B2 * | 3/2009 | Chen et al. | 378/198 |
| 7,505,556 | B2 | 3/2009 | Chalmers et al. | 378/57 |
| 7,593,506 | B2 | 9/2009 | Cason | 378/90 |
| 7,623,626 | B2 | 11/2009 | Safai et al. | 378/87 |
| 7,642,526 | B2 * | 1/2010 | Xu et al. | 250/491.1 |
| 7,660,386 | B2 * | 2/2010 | Meng et al. | 378/57 |
| 7,663,109 | B2 * | 2/2010 | Kang et al. | 250/359.1 |
| 7,742,568 | B2 * | 6/2010 | Smith | 378/98.11 |
| 2002/0097836 | A1 | 7/2002 | Grodzins et al. | 378/57 |
| 2002/0185612 | A1 | 12/2002 | Chalmers et al. | 250/492.1 |
| 2003/0016790 | A1 | 1/2003 | Grodzins et al. | 378/147 |
| 2003/0091145 | A1 | 5/2003 | Mohr et al. | 378/58 |
| 2004/0057554 | A1 | 3/2004 | Bjorkholm | 378/143 |
| 2004/0086078 | A1 | 5/2004 | Adams et al. | 378/57 |
| 2004/0251415 | A1 | 12/2004 | Verbinski et al. | 250/358.1 |
| 2004/0256565 | A1 | 12/2004 | Adams et al. | 250/358.1 |
| 2005/0190878 | A1 | 9/2005 | De Man et al. | 378/9 |
| 2006/0078091 | A1 | 4/2006 | Lasiuk et al. | 378/198 |
| 2007/0009088 | A1 | 1/2007 | Edic et al. | 378/62 |
| 2009/0086907 | A1 | 4/2009 | Smith | 378/57 |

FOREIGN PATENT DOCUMENTS

| | | |
|---|---|---|
| EP | 0 864 884 | 7/2006 |
| GB | 2277013 | 10/1994 |
| GB | 2287163 | 9/1995 |
| GB | 2400480 | 10/2004 |
| JP | 63079042 | 4/1988 |
| WO | WO 98/02763 | 1/1998 |
| WO | WO 98/03889 | 1/1998 |
| WO | WO 98/20366 | 5/1998 |
| WO | WO 99/39189 | 8/1999 |
| WO | WO 00/33060 | 6/2000 |
| WO | WO 00/37928 | 6/2000 |
| WO | WO 2004/010127 | 1/2004 |
| WO | WO 2004/043740 | 5/2004 |

OTHER PUBLICATIONS

André H. Lawrence, "Cargo Inspection Technologies", The International Society for Optical Engineering, vol. 2276, Jul. 1994.

Chou, C., "Fourier coded-aperture imaging in nuclear medicine", IEEE Proc. Sci. Meas. Technol., vol. 141. No. 3, May 1994, pp. 179-184.

Mertz, L.N., et al., "Rotational aperture synthesis for x rays", Journal. Optical Society of America, vol. 3, Dec. 1966, pp. 2167-2170.

Moller, K-Bo, European Patent Office, International Search Report, Oct. 29, 2010, PCT/US2010/043201, 7 pages.

Rouault, Patrick, European Patent Office, Written Opinion of International Searching Authority, Oct. 29, 2010, PCT/US2010/043201, 6 pages.

European Patent Office, *Summons to attend oral proceedings pursuant to Rule 115(1) EPC*, Application No. 05743513.3-2204/1733213, dated May 6, 2009, 3 pages.

European Patent Office, *International Search Report*, PCT/US98/18642, dated Jul. 7, 1999, 6 pages.

International Preliminary Examining Authority-US, *International Preliminary Examination Report*, PCT/US98/18642, dated Aug. 30, 1999, 4 pages.

European Patent Office, *International Search Report*, International Application No. PCT/US99/28266, dated Sep. 6, 2000, 3 pages.

European Patent Office, *International Search Report*, PCT/US99/28035, dated Sep. 15, 2000, 6 pages.

International Preliminary Examining Authority-US, *Written Opinion*, International Application No. PCT/US99/28035; dated Apr. 20, 2001, 4 pages.

International Preliminary Examining Authority-US, *International Preliminary Examination Report*, PCT/US99/28035, dated Mar. 25, 2002, 3 pages.

European Patent Office, *International Search Report and Written Opinion of the International Searching Authority*, PCT/US2005/011382, dated Oct. 21, 2005, 11 pages.

International Bureau of WIPO, *International Preliminary Report on Patentability*, PCT/US2005/011382, dated Oct. 19, 2006, 7 pages.

European Patent Office, *Written Opinion of the International Searching Authority*, PCT/US2007/066936, dated Sep. 30, 2008, 7 pages.

European Patent Office, *International Search Report*, PCT/US2007/066936; dated: Sep. 30, 2008, 5 pages.

Memorandum of Decision, Sep. 16, 2005, in *L-3 Communications Security and Detection Systems Corporation Delaware v. American Science & Engineering, Inc.*, U.S. District Court of Massachusetts, Civil Action No. 04-10339-RWZ.

As&E's Motion for Reconsideration of Partial Summary Judgment and, in the Alternative, Entry of Final Judgment and a Stay Pending Appeal, Oct. 7, 2005, in *L-3 Communications Security and Detection Systems Corporation Delaware v. American Science & Engineering, Inc.*, U.S. District Court of Massachusetts, Civil Action No. 04-10339-RWZ.

AS&E's Memorandum in Support of its Motion for Reconsideration of Partial Summary Judgment and, in the Alternative, Entry of Final Judgment and a Stay Pending Appeal, Oct. 7, 2005, in *L-3 Communications Security and Detection Systems Corporation Delaware v. American Science & Engineering, Inc.*, U.S. District Court of Massachusetts, Civil Action No. 04-10339-RWZ.

Declaration of Samuel J. Petuchowski, Ph.D., Esq. Oct. 7, 2005, in *L-3 Communications Security and Detection Systems Corporation Delaware v. American Science & Engineering, Inc.*, U.S. District Court of Massachusetts, Civil Action No. 04-10339-RWZ.

U.S. Army Contract DAAB10-95-C-0001, Oct. 19, 1994.

Amended Complaint for Declaratory Judgment, CA No. 04-10339-RWZ, Jun. 17, 2004.

American Science & Engineering's Answer to L-3's Amended Complaint and Counterclaims for Patent Infringement, CA No. 04-10339-RWZ, Jun. 30, 2004.

L-3's Memorandum in Support of its Motion for Partial Summary Judgment that Certain Claims of U.S. Patent No. 5,903,623 are Invalid Under 35 U.S.C.§102(b), CA No. 04-10339-RWZ, Mar. 3, 2005.

L-3's Local Rule 56.1 Statement of Facts in Support of its Motion for Partial Summary Judgment that Certain Claims of U.S. Patent No. 5,903,623 are Invalid Under 35 U.S.C.§102(b), CA No. 04-10339-RWZ, Mar. 3, 2005.

AS&E's Opposition to L-3's Motion for Partial Summary Judgment Concerning the Validity of U.S. Patent No. 5,903,623, , CA No. 04-10339-RWZ, Mar. 17, 2005.

AS&E's LR 56.1 Statement of Material Facts Opposing L-3's Motion for Partial Summary Judgment Concerning the Validity of U.S. Patent No. 5,903,623, , CA No. 04-10339-RWZ,, Mar. 17, 2005.

L-3's Reply Memorandum in Support of its Motion for Partial Summary Judgment that Certain Claims of U.S. Patent No. 5,903,623 are Invalid Under 35 U.S.C. 21§102(b), CA No. 04-10339-RWZ, Apr. 4, 2005.

AS&E "*Mobile Cargossearch: X-Ray Inspection System*" Tech Proposal I of II, Jan. 31, 1994.

European Patent Office, Officer Patrick Rouault, Written Opinion, PCT/US2010/043201, date of mailing, Oct. 29, 2010, 6 pages.

\* cited by examiner

TOP-DOWN X-RAY INSPECTION TRAILER

The present application claims priority from U.S. Provisional Application Ser. No. 61/229,452, entitled "Top-Down X-Ray Inspection Trailer," and filed on Jul. 29, 2010, which is incorporated herein by reference.

TECHNICAL FIELD

The present invention relates to systems and methods for inspecting objects with penetrating radiation, and, more particularly, the invention relates to inspection systems that may be deployed on mobile platforms of various sorts.

BACKGROUND ART

The interdiction of illicit drugs, explosives, and other contraband is an important goal of law enforcement. To that end, a variety of technologies have been developed and deployed for the non-intrusive inspection of objects, such as vehicles or containers, that are not readily susceptible to visual scrutiny from the outside. The non-intrusive aspect of these inspection techniques is important; the great majority of containers do not carry contraband, and the public would not long tolerate the delays, disruption (and in some cases damage) of property, and invasions of privacy that would occur if invasive inspection means were commonly used. Non-intrusive inspection is typically non-destructive and can usually be accomplished faster than intrusive inspection, thereby increasing productivity of inspectors. Increased productivity means more containers inspected and more contraband interdicted.

Among non-intrusive inspection methods, x-ray imaging in its many forms is a proven technology capable of detecting a variety of contraband. X-ray systems have been based on transmission imaging in any of a variety of implementations: cone-beam, fanbeam, flying-spot, multi-projection configurations; dual-energy imaging; computed tomography; as well as on imaging incorporating the detection of x-ray radiation scattered in various directions. Imaging using scattered x-rays detected from a mobile platform is the subject, for example, of U.S. Pat. No. 5,764,683, issued Jun. 9, 1998, which is incorporated herein by reference.

It is desirable to determine the presence of objects, such as contraband, weapons, or explosives, that have been concealed, for example, in a moving vehicle, or on a person, or in any inspected object, while the inspected object is moved past one or more systems that image the contents of the object using penetrating radiation. The determination should be capable of being made while the inspected object is in motion, or, alternatively, while the inspection system is in motion with respect to the inspected person or object. Indeed, since inspection rate, and thus hourly throughput, is at a premium, it is desirable that the vehicle, for example, be driven without requiring the driver or passengers to alight. In cases where a detection is made, a visual image should be available for verification.

Various inspection systems that have been deployed employ radiation that is incident on the inspected object and then scattered by the object and its contents in various directions. The use of images produced by detection and analysis of penetrating radiation scattered from an irradiated object, container, or vehicle is the subject, for example, of U.S. Pat. No. 6,459,764, to Chalmers et al. (the "Chalmers patent"), issued Oct. 1, 2002, and incorporated herein by reference. The Chalmers patent teaches backscatter inspection of a moving vehicle by illuminating the vehicle with x-rays from above or beneath the moving vehicle, as well as from the side, however, each of the backscatter systems taught therein require ponderous fixed-site installations.

In accordance with the teachings of the present invention, imaging and inspection capabilities are enhanced by providing not only scatter-based imaging, but, instead, or additionally, a transmission image obtained by means of a vertical view through the inspected object is provided. A vertical view through an automobile or truck, for example, is particularly advantageous because observing contraband inside the vehicle by means of a downward-directed beam requires penetration of less metal than would be required by a view transverse to the direction of motion of the vehicle.

The use of an x-ray source and an x-ray detector, both located in a portal, for purposes of screening personnel, is the subject, for example, of U.S. Pat. No. 6,094,472, to Smith, issued Jul. 25, 2000, and incorporated herein by reference. A portal, however, is not typically amenable to rapid and flexible deployment, but, rather, requires a dedicated installation. An inspection system providing these features is desirable.

SUMMARY OF EMBODIMENTS OF THE INVENTION

In one embodiment of the present invention, there is provided a rapidly relocatable inspection system for inspecting an object. The inspection system has a conveyance capable of on-road travel, with a source of penetrating radiation mounted on the conveyance. The source is mounted on a deployable member, such as a boom, that deploys outward from the conveyance, and directs a first beam of penetrating radiation in a substantially vertical direction. A detector mechanically coupled to the conveyance detects penetrating radiation from the source after interaction of the object with the penetrating radiation, and generates a detector signal. Finally, the inspection system has a controller for creating an image of contents of the object based at least on the detector signal.

In alternate embodiments of the invention, the conveyance may be self-propelled, and it may be a trailer. The detector that is mechanically coupled to the conveyance may be deployed from the conveyance prior to inspection operation. It may be mechanically supported by an underlying surface during self-propelled passage thereover by an inspected vehicle, and at least one ramp may be coupled to the detector for facilitating passage thereover by an inspected vehicle. It may also be disposed on a deployable member, such as a boom, coupled to the conveyance.

In further embodiments, the source may include a collimator for shaping the beam of penetrating radiation, such as into a fan beam, and may also include a beam scanning mechanism, such as a rotating chopper wheel. The inspection system may also have at least one scatter detector for detecting penetrating radiation scattered by contents of the object and for generating a scatter signal. A display may be provided for displaying an image of material disposed within the object based at least on a scatter or transmission signal.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
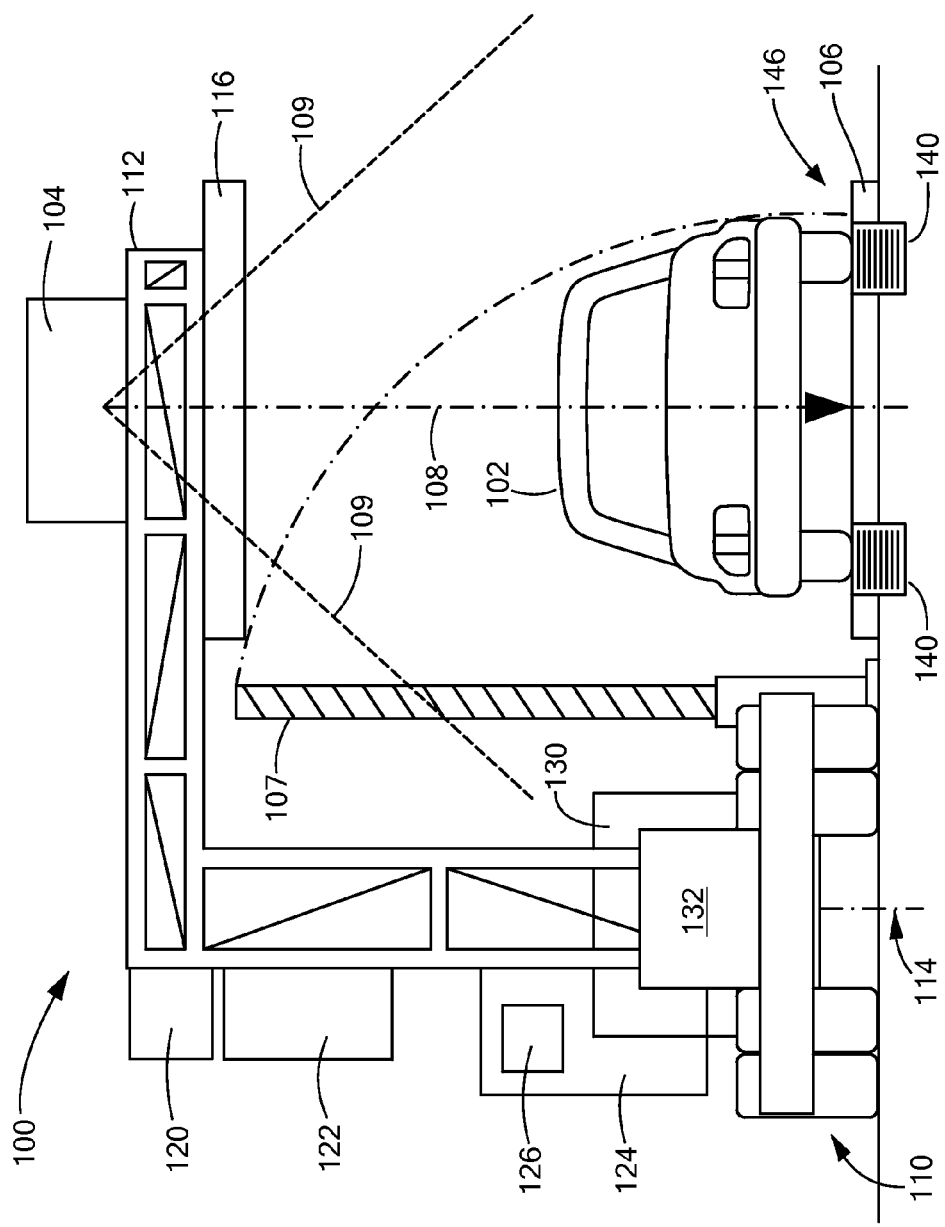
FIG. 1 shows an end view of a vehicle alongside an inspection system in accordance with embodiments of the present invention.

As used in this description and in the appended claims, a "vehicle" includes any conveyance that may be driven, pushed, or pulled from one place to another, whether over the surface of land or otherwise. The term "vehicle," as used herein, further includes the structures, components and contents that are conveyed together with the vehicle.

The invention described herein serves to characterize materials which may be contained within a vehicle and thus not readily susceptible to visual scrutiny. The characteristics of a material which might be the object of non-invasive inspection and which lend themselves to detection using the device and method taught by the invention include, but are not limited to, electron density, atomic number, mass density, linear dimensions and shape. These characteristics are unveiled by taking advantage of the various physical processes by which penetrating radiation interacts with matter. Penetrating radiation refers to electromagnetic radiation of sufficient energy per photon to penetrate materials of interest to a substantial and useful degree and include x-rays and more energetic forms of radiation. The interaction of such radiation with matter can generally be categorized as either scattering or absorption processes. Both types of process remove x-ray photons from a collimated (i.e., directional) beam; scattering processes do so by deflecting photons into new directions (usually with loss of energy), while absorption processes simply remove photons from the beam.

Conventional transmission imaging measures the total beam attenuation as a function of position on the image plane, without discriminating between absorption and scattering processes. The total beam attenuation is described by a parameter called the mass attenuation coefficient, as commonly employed by persons skilled in the art of x-ray inspection. The mass attenuation coefficient is a characteristic of a particular material at a specific x-ray photon energy, and is independent of the imaging geometry. As such, it is the sum of individual coefficients (or "cross sections") for each relevant physical process, each of which varies differently with x-ray energy and with the atomic number (Z) of the interacting material.

In the range of photon energies useful for penetrating and screening vehicles, the scattering contribution is dominated by incoherent, or Compton scattering, and the absorption contribution is dominated by the photoelectric effect at lower energies, and by pair production at higher energies. The cross sections for Compton scattering and photoelectric absorption vary with both the atomic number of the material and with the energy of the x-ray photon, but in very different ways. The photoelectric absorption decreases very rapidly with increasing photon energy, and increases very rapidly with increasing Z of the material. The Compton scattering cross section changes very slowly with energy and is only weakly dependent on atomic number. The pair production cross section can be ignored for sources with an energy below about 4 MeV, and increases with increasing Z of the material. Such differences in scattering and absorption characteristics between low Z materials, characteristic of organic materials, and high Z materials, characteristic of most metals and their alloys, are typical and provide the means to differentiate between these two classes of materials.

Transmission x-ray images, taken alone, provide a map of the attenuation characteristics of the inspected object for the full spectrum of the x-ray beam. It should be noted that images may be directly displayed in graphic format for the visual inspection of human operators, but need not be so displayed. As used in this description and in the appended claims, the term "image" refers to any multidimensional representation, whether in tangible or otherwise perceptible form or otherwise, whereby a value of some characteristic is associated with each of a plurality of locations corresponding to dimensional coordinates of an object in physical space, though not necessarily mapped one-to-one thereonto. Thus, for example, the graphic display of the spatial distribution of some feature, such as atomic number, in one or more colors constitutes an image. So, also, does an array of numbers in a computer memory or holographic medium. Similarly, "imaging" refers to the rendering of a stated physical characteristic in terms of one or more images.

Backscatter imaging, in which the x-rays scattered by a material in a generally backward direction are employed, offers several unique inspection capabilities and operational features. (1) Taken alone, it is a one-sided imaging modality: images can be obtained even when the object is accessible from only one side, or, the object is too thick to be penetrated radiographically. (2) Because the scatter signal falls off quite rapidly with increasing depth into the object, backscatter images effectively represent a "slice" of the object characteristic of the side nearest to the x-ray source; this image is frequently useful even when a transmission image representing the same scanned area is hopelessly confused by image clutter. (3) The underlying physical phenomenon that leads to scattered radiation is the Compton effect. Low atomic number (low Z) materials, which encompass organic materials, interact with x-rays principally by Compton scattering. Narcotic drugs, being among the densest of organic materials, tend to produce the brightest signatures in a backscatter image, as do organic explosives, making backscatter imaging a useful imaging modality for bomb or drug detection. (4) Alignment requirements of the x-ray beam with detectors or collimation devices are less exacting than for transmission imaging thereby enabling rapid deployment in a wide range of inspection scenarios.

It is known to persons skilled in the art of x-ray inspection that high-Z and low-Z materials may be separately identified by measuring total attenuation at two different photon energies. This is the basis for dual-energy systems. Another method to image low-Z materials is backscatter imaging. The technique relies upon the direct detection of photons which have been Compton scattered. An image is created that is separate and independent of any transmission image that may be produced at the same time. Since the photoelectric absorption cross section is small for organic materials, they interact almost entirely through Compton scattering, producing relatively large scatter signatures. Metals, on the other hand, interact almost exclusively by photoelectric absorption, so that their scatter image signature is comparatively small. The backscatter image directly reveals organic materials such as drugs or explosives.

Flying-spot technology makes possible the acquisition of images using detectors specifically positioned to collect the scattered x-rays. In a typical flying-spot system, a thin "pencil beam" of x-rays is rapidly and repetitively swept through a source-centered, vertically-oriented "fan" of beam paths that are arranged to intercept the object under inspection. At the same time, the object is moved at a constant, slower speed along a path perpendicular to the fan, on a horizontally moving conveyor belt for example, or in the case of vehicles, by being propelled or towed through the beam. In this way, the pencil beam is made to traverse the object in point-by-point raster fashion, and the entire object is scanned as it passes through the fan plane over a period ranging from a few seconds to a few minutes depending upon the length of the object and its speed.

Although the total scan time may be seconds to minutes in duration, the actual exposure time of any part of the scanned object is only the time it takes for the pencil beam to sweep across that part. That exposure time for a given part of the object is typically in the range of 8 to 64 microseconds, depending on the design and the application, and yields an entrance exposure to the scanned object of only tens or hundreds of microroentgens. This low dose to the object also means that there is little radiation available to scatter into the environment, so the doses to operators and other bystanders is correspondingly low. Separate, large-area detectors are deployed adjacent to the beam plane on the x-ray source side of the scanned object, and with their active surfaces oriented toward the scanned object. These detectors need only provide a large solid angle for collection of scattered radiation; no critical alignments are required. In this location these detectors respond to x-rays which are scattered generally back toward the source from the object.

Typically, x-ray transmission by organic materials is greater than by higher density, higher atomic-number materials such as metals. Since the x-ray transmission image is a result of interactions throughout a path through the entire object, larger and more complex objects such as cargo containers produce more confusing transmission images. Under these circumstances, even the presence of small amounts of metal and normal expected organic materials can produce extremely cluttered images masking the sought-for contraband. Image interpretation then becomes an overwhelming task. Frequently, much of the useful information is obtained from the backscatter image alone.

A preferred embodiment of the present invention is now described with reference to FIG. 1, where a rapidly relocatable x-ray inspection device, designated generally by numeral 100 is shown in a deployed configuration used for inspection of a vehicle 102. Both the relocatable x-ray inspection device 100 and the inspected vehicle 102 are seen from the back. The rapidly relocatable inspection device is entirely integral with a conveyance, designated generally by numeral 110. Conveyance 110 may be a truck, capable of self-propulsion on, or off, roads, or conveyance 110 may also be a trailer that may be hauled by a truck or other self-propelled tractor.

Salient features of this embodiment of the rapidly relocatable x-ray inspection device 100 include a source 104 of downward-directed penetrating radiation and a transmission detector 106 of penetrating radiation that has been emitted by source 104 and has traversed the inspected vehicle 102. A top-down view through a vehicle provides a better view of most regions of the vehicle when compared with a lateral view, with superior views, particularly, of the trunk area, the fuel tank, and the seating area.

Source 104 typically includes an x-ray tube or other source of x-ray emission, as well as spectral-shaping elements, such as one or more filters, and beam-shaping elements, such as one or more collimators. In accordance with certain embodiments of the invention, x-rays having maximal energies in the range between 160 keV and 300 keV are employed. At this energy, x-rays penetrate into a vehicle, and organic objects inside the vehicle can be detected. Since lower doses of x-ray irradiation are thus possible, automobiles may be scanned using the present invention. For applications where the scanned vehicle may contain personnel, end point energies below 300 keV are preferred. The scope of the present invention, however, is not limited by the range of energies of the penetrating photons employed.

Spectral- and beam-shaping elements are described, for example, in U.S. Pat. No. 6,459,761, "Spectrally Shaped Inspection Beam," issued Oct. 1, 2002, and incorporated herein by reference.

In certain embodiments of the invention, such as those that employ backscatter imaging, the emission of source 104 is shaped into a beam 108 that has the shape of a pencil beam. However, in other embodiments of the invention, beam 108 may be a fan beam, or may have another cross-sectional profile. Beam 108 may be swept, such as by means of a chopper wheel, as described, for example, in U.S. Pat. No. 6,459,764, "Drive-Through Vehicle Inspection System," issued Oct. 1, 2002, and incorporated herein by reference.

Source 104 is disposed on a deployable member, which, in the embodiment depicted in FIG. 1, is a boom 112 that may be extended outward from conveyance 110 by rotation about a central axis designated by line 114 substantially upright and perpendicular to the direction of road travel of the conveyance. Typically, boom 112 rotates by approximately 90° between its stowed position, for on-road travel, and its deployed position, for inspection operation.

Conveyance 110 also carries a high-voltage power supply 120 to power source 104 as well as a cooling module 122 and an electronics module 124, including controller 126. Additionally, conveyance 110 typically includes an electrical generator 130, such as a gasoline-powered genset, and a fuel tank 132.

Concurrently with transmission imaging by means of transmission detector 106, a scatter image may be obtained through use of a scatter detector, such as backscatter detector 116. In the case where scatter information is to be obtained, beam 108 is a pencil beam, and it is swept between scan limits 109 in a plane transverse to forward motion of vehicle 102 through inspection system 100.

One or more ramps 140 may be provided to allow vehicle 102 to smoothly transition over a module 146 in which transmission detector 106 is contained. Module 146 is stowed aboard conveyance 110 in a vertical position shown by the dashed lines designated by numeral 107, or can be manually stowed on conveyance 110. For inspection operations, module 146 is deployed such that transmission detector 106 is parallel to the ground, while remaining coupled to conveyance 110.

Figure 2:
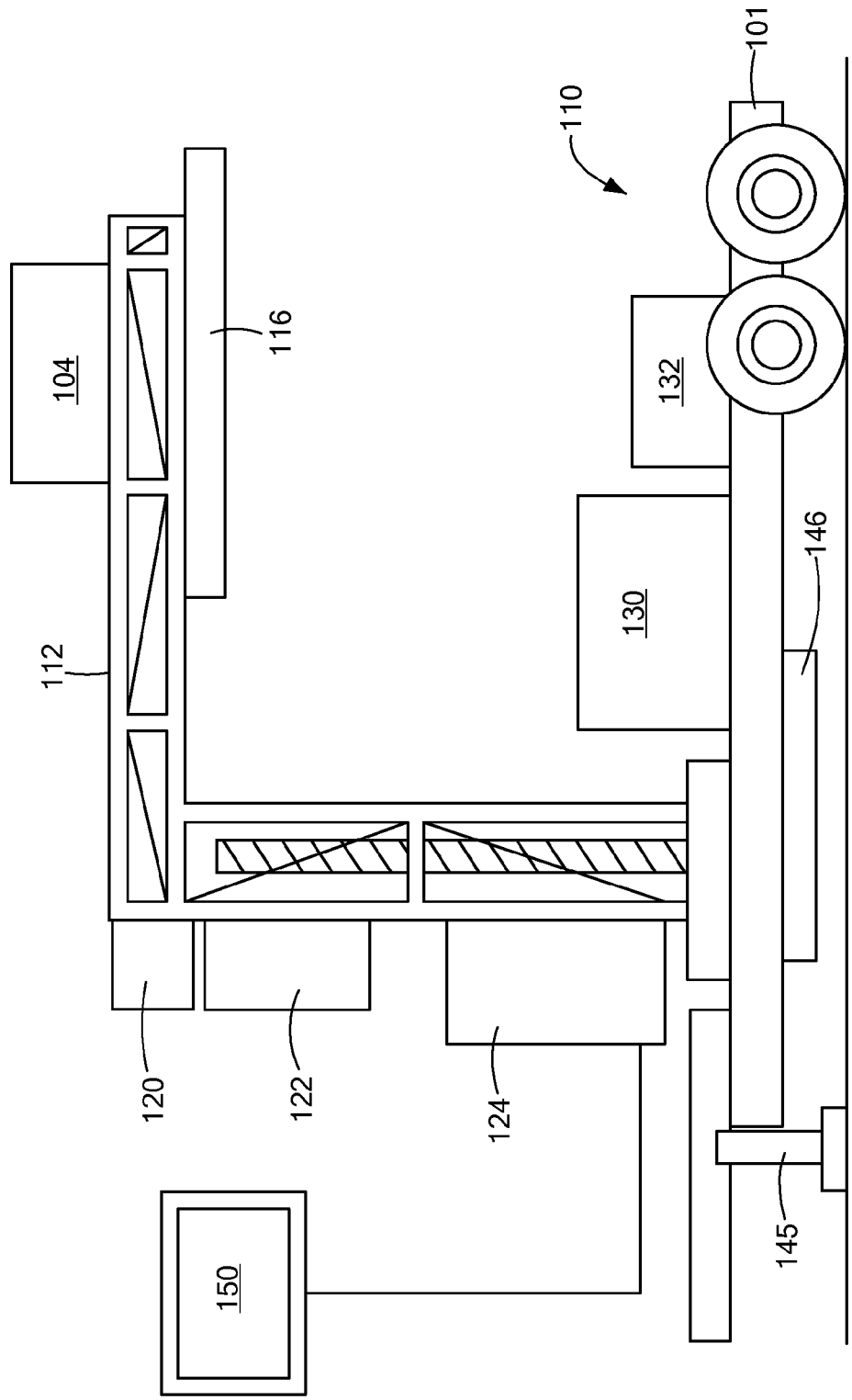
FIG. 2 shows a side view of an x-ray inspection system with an x-ray source shown in a stowed position, in accordance with embodiments of the present invention.

A side view of mobile x-ray inspection device 100 is shown in FIG. 2 with source 104 of penetrating radiation in a stowed position by virtue of "L"-shaped boom 112 being rotated so as to align with a direction of motion of conveyance 110 when traveling overland to a deployment locale where a checkpoint is to be operated. Once inspection system 100 is deployed at a desired inspection location, one or more jackscrews or similar devices 145 (shown in FIG. 1) may be deployed for mechanical stabilization of the system. In a typical embodiment of the invention, conveyance 110 may be a truck, typically 35' long×8' wide×10'6" high, though other dimensions are within the scope of the present invention. During road travel of conveyance 110, module 146 can optionally be stowed beneath bed 101 as shown in FIG. 2, rather than in the vertical position as shown in FIG. 1.

In response to penetrating radiation transmitted through, or scattered by, vehicle 102 and its contents, transmission detector 106 and backscatter detector 116 produce transmission and backscatter signals, respectively. Processor 126 processes data from the transmission and/or backscatter signals to produce one or more images that may be displayed on display device 150 to be viewed by an operator who may be located either locally or remotely to conveyance 110.

Besides imaging contents of inspected vehicles, in terms of which embodiments of the present invention have been described, other characteristics of inspected objects may be obtained within the scope of the present invention. For example, transmission and backscatter techniques may be applied, as known in the art, for deriving mass, mass density, mass distribution, mean atomic number, or likelihood of containing targeted threat material.

Figure 3:
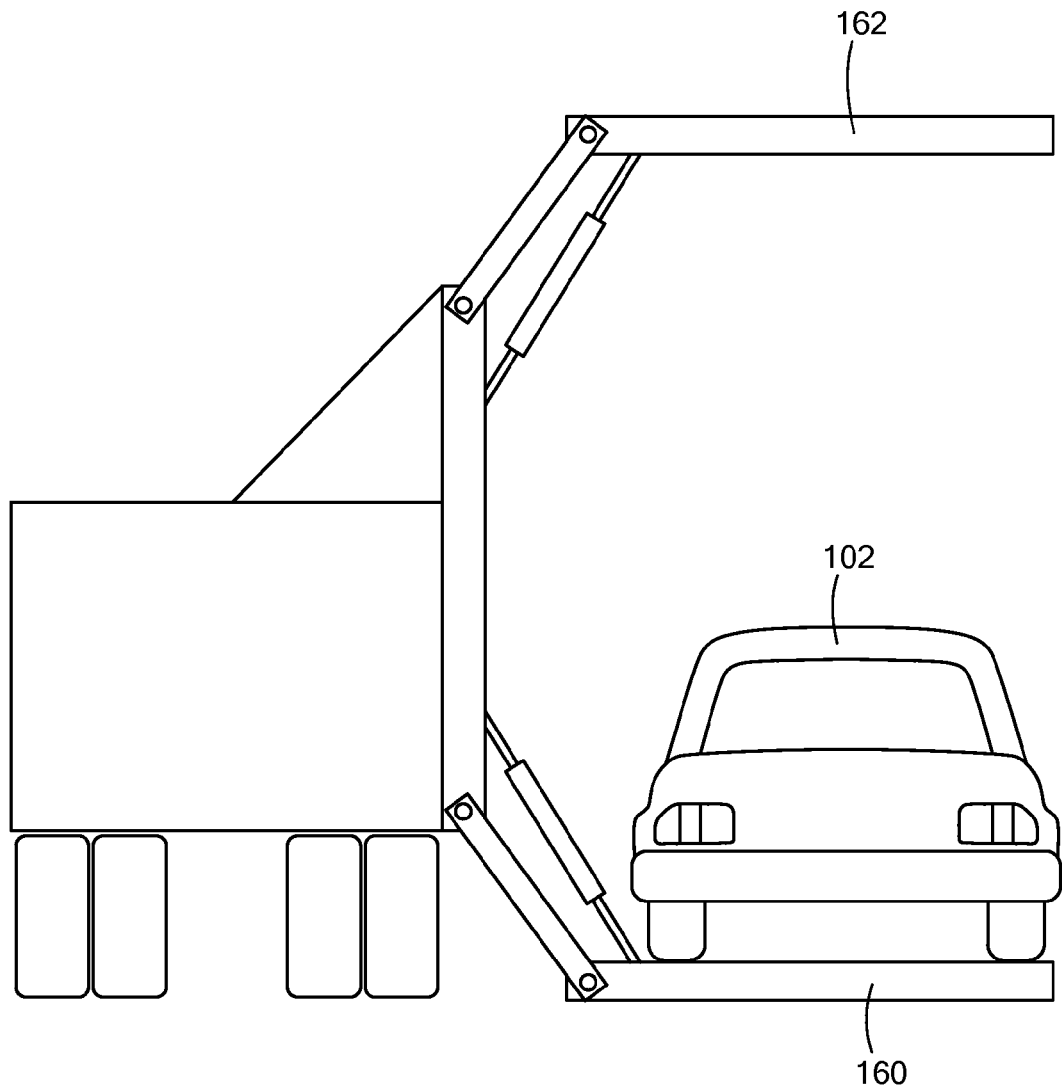
FIG. 3 shows a rear view of an x-ray inspection system with an x-ray source deployed beneath an inspected vehicle, in accordance with embodiments of the present invention.

While the invention, heretofore, has been described in terms of an x-ray beam directed down towards the ground, it is to be understood that a beam shooting in the upward direction is also within the scope of the invention. In accordance with other embodiments of the invention, as depicted, for example, in FIG. 3, a low-profile source 160 (such as one that uses carbon nanotube cathodes as described in U.S. Pat. No. 7,505,562) may be deployed from conveyance 110 to a position beneath the vehicle 102 being scanned, such that vehicle 102 can be driven over the source. A detector 162 is deployed above the vehicle 102 being scanned.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. An inspection system for inspecting an object, the system comprising:
   a. a conveyance capable of on-road travel characterized by an axis along a direction of road travel;
   b. a source of penetrating radiation including a beam scanning mechanism disposed on a deployable member, the deployable member coupled to the conveyance, for providing a swept pencil beam of penetrating radiation directed in a substantially vertical direction;
   c. a detector mechanically coupled to the conveyance and supported by an underlying surface during self-propelled passage thereover by an inspected vehicle for detecting penetrating radiation from the source after interaction of the object with the penetrating radiation and for generation of a detector signal corresponding to detected radiation; and
   d. a controller for creating an image of contents of the object based at least on the detector signal.

2. The inspection system as set forth in claim 1, wherein the deployable member is a boom.

3. The inspection system as set forth in claim 2, wherein the boom is capable of extension outward at approximately 90° to the direction of road travel of the conveyance during the course of inspection.

4. The inspection system as set forth in claim 1, wherein the conveyance is self-propelled.

5. The inspection system as set forth in claim 1, wherein the conveyance includes a trailer.

6. The inspection system as set forth in claim 1, wherein the detector mechanically coupled to the conveyance is deployed from the conveyance prior to inspection operation.

7. The inspection system set forth in claim 1, further comprising at least one ramp coupled to the detector for facilitating passage thereover by an inspected vehicle.

8. The inspection system as set forth in claim 1, wherein the source of penetrating radiation includes a collimator for shaping the swept pencil beam of penetrating radiation.

9. The inspection system as set forth in claim 1, wherein the beam scanning mechanism is a rotating chopper wheel.

10. The inspection system as set forth in claim 1, further comprising at least one scatter detector for detecting penetrating radiation scattered by contents of the object and for generating a scatter signal.

11. The inspection system as set forth in claim 1, further comprising a display for displaying an image of material disposed within the object based at least on the transmission signal.

12. The inspection system set forth in claim 1, further comprising a module deployed from the conveyance for inspection operation, whereupon the detector is disposed.

13. The inspection system set forth in claim 1, further comprising a low-profile source is disposed beneath the object of inspection.

* * * * *